(12) United States Patent
Martin et al.

(10) Patent No.: US 9,106,573 B2
(45) Date of Patent: *Aug. 11, 2015

(54) IN-BAND SIGNALING FOR POINT-MULTIPOINT PACKET PROTECTION SWITCHING

(71) Applicant: Ciena Corporation, Hanover, MD (US)

(72) Inventors: David Wright Martin, Stittsville, CA (US); Marc Holness, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,737

(22) Filed: Jul. 29, 2014

(65) Prior Publication Data
US 2015/0063097 A1    Mar. 5, 2015

Related U.S. Application Data

(63) Continuation of application No. 13/549,627, filed on Jul. 16, 2012, now Pat. No. 8,792,509, and a continuation of application No. 12/421,227, filed on Apr. 9, 2009, now Pat. No. 8,243,743.

(51) Int. Cl.
| | |
|---|---|
| H04L 12/28 | (2006.01) |
| H04L 12/703 | (2013.01) |
| H04L 12/46 | (2006.01) |
| H04L 12/761 | (2013.01) |
| H04L 12/707 | (2013.01) |

(52) U.S. Cl.
CPC ............ *H04L 45/28* (2013.01); *H04L 12/4625* (2013.01); *H04L 45/16* (2013.01); *H04L 45/22* (2013.01)

(58) Field of Classification Search
CPC ..... H04L 12/4625; H04L 45/16; H04L 45/22; H04L 45/28; H04L 2012/5612; H04L 2012/5627; H04L 49/105; H04L 12/462; H04L 45/165
USPC .......................................... 370/225, 408, 360
See application file for complete search history.

(56) References Cited

U.S. PATENT DOCUMENTS

| | | | | |
|---|---|---|---|---|
| 8,175,008 | B1 * | 5/2012 | Rustagi et al. ................. | 370/255 |
| 8,243,743 | B2 * | 8/2012 | Martin et al. .................. | 370/408 |
| 8,259,590 | B2 * | 9/2012 | Shah et al. ..................... | 370/242 |
| 8,279,752 | B1 * | 10/2012 | Busch et al. ................... | 370/228 |
| 2007/0268817 | A1 * | 11/2007 | Smallegange et al. ......... | 370/216 |
| 2010/0290345 | A1 * | 11/2010 | Gero et al. ................. | 370/241.1 |

* cited by examiner

*Primary Examiner* — Edan Orgad
*Assistant Examiner* — Emmanuel Maglo
(74) *Attorney, Agent, or Firm* — Clements Bernard PLLC; Christopher L. Bernard; Lawrence A. Baratta, Jr.

(57) ABSTRACT

A method and system provide in-band protection switch signaling in a communication system arranged as a point-to-multipoint tree. The point-to-multipoint tree includes a root node communicatively coupled to a plurality of leaf nodes through both a working link and a protection link. Data is transferred through a current link of the point-to-multipoint tree. The current link is either the working link or the protection link. A fault is detected in the current link in the point-to-multipoint tree. Each leaf node in the point-to-multipoint tree is notified of the fault using the current link. Upon receiving the notification, the root node and each leaf node switch to the other link of the working link and the protection link.

20 Claims, 9 Drawing Sheets

| | 1 | | | | | | | 0 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| PGID 3 Request | | | | | | | | PGID 2 Request | | | | PGID 1 Request | | | PGID 0 Request |

| | 3 | | | | | | | 2 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| PGID 7 Request | | | | | | | | PGID 6 Request | | | | PGID 5 Request | | | PGID 4 Request |

· · ·

| | 15 | | | | | | | 14 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| PGID 31 Request | | | | | | | | PGID 30 Request | | | | PGID 29 Request | | | PGID 28 Request |

48

| | | |
|---|---|---|
| x1111 | Lockout of Protection (LoP) | Highest priority |
| x1110 | Force Switch to Protection (FS) | |
| x1101 | Signal Fail on Protection (SF-P) | |
| x1100 | Signal Fail on Working (SF-W) | |
| x011 | Manual Switch to Protection (MS-P) | |
| x010 | Manual Switch to Working (MS-W) | |
| x000-x001 | <reserved> | Lowest priority |

Request 52

IN-BAND SIGNALING FOR POINT-MULTIPOINT PACKET PROTECTION SWITCHING

CROSS-REFERENCE TO RELATED APPLICATIONS

The present Application for Patent is a continuation of U.S. Pat. No. 8,792,509, entitled "IN-BAND SIGNALING FOR POINT-MULTIPOINT PACKET PROTECTION SWITCHING," issued Jul. 29, 2014, which is a continuation of U.S. Pat. No. 8,243,743, entitled "IN-BAND SIGNALING FOR POINT-MULTIPOINT PACKET PROTECTION SWITCHING," issued Aug. 14, 2012, assigned to the assignee hereof, and expressly incorporated herein by reference in its entirety

FIELD OF THE INVENTION

The present invention relates generally to packet communication networks and more specifically to a method and system for coordinating protection switching of the endpoints of a point-multipoint tree topology.

BACKGROUND OF THE INVENTION

A point-to-multipoint ("P2MP") link is a specific type of multipoint link which consists of a central connection endpoint ("CE") that is in direct communication with multiple peripheral CEs. A point-to-multipoint link may be viewed as a tree structure having a root node in direct communication with a plurality of leaf nodes, wherein the central connection endpoint, or backbone edge bridge ("BEB") is represented as the root node and the peripheral CEs (also BEBs) are leaf nodes. Any transmission of data that originates from the central CE is received by all of the peripheral CEs while any transmission of data that originates from any of the peripheral CEs is only received by the central CE. The leaf nodes cannot communicate with each other directly, but may communicate through the root node.

Examples of communication networks using point-to-multipoint links may include a corporation having a "central" headquarters and a number of off-site locations with each off-site location communicating with the headquarters over a corporate intranet. Other examples may include a financial institution, such as a bank, having a home office and several "branch" offices with each branch communicating back to the main office through a dedicated path. In each instance, one facility, location or server acts as a root node, serving as a "go-between" for the entire network.

Often, communication networks include a "working" path and a "protection" path. In some networks, the path has a tree structure. The protection tree includes a series of redundant core nodes and links which provide an alternate route between the root node and the leaf nodes. Ideally, the protection tree is route diverse, i.e., both node diverse and link diverse. Thus, if a link in the working tree should fail, traffic may be routed to the protected tree and vice versa.

Currently, IEEE standard 802.1 Q-2005 amendment 802.1 Qay is before the Institute of Electronic and Electrical Engineers ("IEEE") standards committee. The new amendment defines a solution for point-to-point trunk protection switching only, even though the amendment also defines a point-to-multipoint trunk structure. Currently, there is no in-band signaling solution for coordinating the protection switching of the endpoints of a point-to-multipoint open systems interconnection ("OSI") layer 2 tree topology.

Additionally, certain provisions of the point-to-point protection switching protocol proposed in amendment 802.1Qay would be impractical or impossible to implement on a point-to-multipoint basis. For example, management system requests originating from an operator are currently routed to both ends of a point-to-point trunk under the proposed standard. In the context of a point-to-multipoint system containing n leaf nodes, this type of implementation would require n+1 requests to be processed through the system. For large values of n, this approach needlessly bogs down the system and requires considerably more time to allow for switching, thereby increasing the likelihood that some leaf nodes may not be on the same link, i.e. working or protection, at any given time. Such a scenario is undesirable for network operators as it results in a greater chance of maintenance actions inadvertently causing undelivered messages.

Therefore, what is needed is a system and method for in-band signaling for use in point-to-multipoint trunk protection switching at the packet layer.

SUMMARY OF THE INVENTION

The present invention advantageously provides a method and system for in-band signaling for protection switching in a point-to-multipoint communication system. Generally, the present invention provides a method for a root node of a point-to-multipoint communication system to act as an in-band signaling proxy agent by reflecting a protection switch request received from a leaf node to all other leaf nodes. Additionally, the present invention defines an automatic protection switching ("APS") type-length-value ("TLV") structure, including a protection group identifier in order to support load-sharing when there is more than a single protection group associated with a given trunk.

In accordance with one aspect of the present invention, a method is provided for in-band protection switch signaling in a communication system. The communication system is arranged as a point-to-multipoint tree. The point-to-multipoint tree includes a root node communicatively coupled to a plurality of leaf nodes through both a working link and a protection link. Data is transferred through a current link of the point-to-multipoint tree. The current link is either the working link or the protection link. A fault is detected in the current link in the point-to-multipoint tree. Each leaf node in the point-to-multipoint tree is notified of the fault using the current link. The root node and each leaf node are switched to other link of the working link and the protection link.

In accordance with another aspect of the present invention, a method is provided for in-band protection switch signaling in a communication system. The communication system is arranged as a point-to-multipoint tree. The point-to-multipoint tree includes a root node communicatively coupled to a plurality of leaf nodes through both a working link and a protection link. The communication system includes an element management system which manages at least one node of the point-to-multipoint tree. A management system request is received from the element management system. The management system request is evaluated to determine whether the communication system is allowed to implement the management system request. If the communication system is allowed to implement the management system request, each node in the point-to-multipoint tree is notified of the management request via the in-band protection switch signaling and the management system request is executed.

In accordance with yet another aspect of the present invention, a communication system is arranged as a point-to-multipoint tree. The communication system includes a root node, a plurality of leaf nodes, a working link and a protection link. The working link includes a first set of core nodes. The first set of core nodes is communicatively coupled between the root node and the plurality of leaf nodes. The protection link includes a second set of core nodes exclusive of the first set of core nodes. The second set of core nodes is communicatively coupled between the root node and the plurality of leaf nodes. The root node is operable to detect a fault in the current link of the point-to-multipoint tree. The current link is either the working link or the protection link. The root node is further operable to notify each leaf node in the tree of the fault using the current link and switch to the other link of the working link and the protection link. Each leaf node is operable to receive a notification of the fault and switch to the other link.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 11 is a diagram showing an alternative format structure of the Value field within an APS TLV, in accordance with the principles of the present invention.

DETAILED DESCRIPTION OF THE INVENTION

Figure 1:
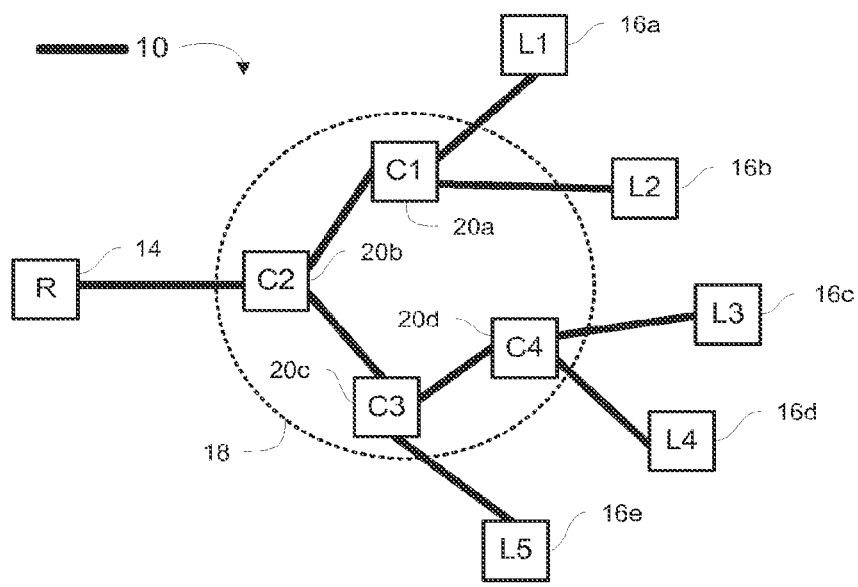
FIG. 1 is a block diagram of a working channel of an exemplary point-to-multipoint ("P2MP") communication system constructed in accordance with the principles of the present invention.

Before describing in detail exemplary embodiments that are in accordance with the present invention, it is noted that the embodiments reside primarily in combinations of apparatus components and processing steps related to implementing a system and method for in-band signaling in a point-to-multipoint communication system using trunk protection switching at the packet layer. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for in-band signaling for protection switching in a point-to-multipoint trunk. Protection switching may be performed automatically in response to a fault indication, or upon operator request. In one embodiment, the root node acts as an in-band signaling proxy agent by reflecting a received leaf node protection switch request to all leaf nodes.

In another embodiment, a protection group identifier ("PGID") enables selectively switching individual protection groups ("PGs") in order to support load-sharing, where there is more than a single protection group associated with a given trunk.

Referring now to the drawing figures in which like reference designators refer to like elements, there is shown in FIG. 1, a working point-to-multipoint link 10 of an exemplary communication system 12 is provided in accordance with the principles of the present invention. Working link 10 connects a first backbone edge bridge, i.e., root node 14, designated as "R", to a plurality of other backbone edge bridges, i.e., leaf nodes L1 16a, L2 16b, L3 16c, L4 16d and L5 16e (referenced collectively as leaf node 16) through a network pipe 18 containing a plurality of backbone core bridges, i.e., core nodes C1 20a, C2 20b, C3 20c and C4 20d (referenced collectively as core node 20). The path of working link 10 is denoted in FIGS. 1-3, 5 and 7 as a thick, black line connecting the nodes. The working link 10 is the normal configuration for routing traffic between the root node 14 and the leaf nodes 16 and is generally preferred for use as long as there is no fault or failure in any of the connections along the path.

Each of the root node 14, leaf nodes 16 and core nodes 20 may include wireless access points, hubs, routers, switches, gateways or any other device commonly known to forward data packets in a communication network. Each of the root node 14, leaf nodes 16 and core nodes 20 may also be electrically connected to one or more client devices (not shown) and routes data packets between client devices along the working link 10 using commonly used communication protocols such as Transmission Control Protocol/Internet Protocol ("TCP/IP"), Ethernet, etc. Of note, although several of the figures show four or seven core nodes 20 and five leaf nodes 16, it is understood that the amount of nodes shown are solely to aid explanation. A communication system 12 constructed in accordance with the principles of the present invention may have any number of core nodes 20 and leaf nodes 16.

Continuity Check Messages ("CCMs") are periodically sent between the root node 14 and each leaf node 16. Both ends of the working link 10, i.e., the root node 14 and the leaf nodes 16, expect to receive a CCM from the other end within a predetermined length of time. Otherwise, it is presumed that there is a fault in one of the connections through the working link 10 and traffic must be rerouted through a different path. CCM messages originating from the root node 14 may be of the form $\langle Gp\_DA, Root\_MAC, B-VID_x \rangle$, wherein Gp_DA is the group destination address of the group containing leaf nodes L1 16a, L2 16b, L3 16c, L4 16d and L5 16e, Root_MAC is the Media Access Control ("MAC") address of the root node 14, and B-VID$_x$ is the backbone virtual local area network identifier ("VID") of the working link 10, i.e., link x. CCM messages originating from a specific leaf node 16 may be of the form $\langle Root\_MAC, Leaf\_SA_n, B-VID_y \rangle$, wherein Root_MAC is the MAC address of the root node 14, Leaf_SA$_n$ is the MAC address of the source leaf node 16 with n=L1 ... L5, and B-VID$_y$ is the backbone VID of link y, which may or may not be the same value as B-VID$_x$.

Figure 2:
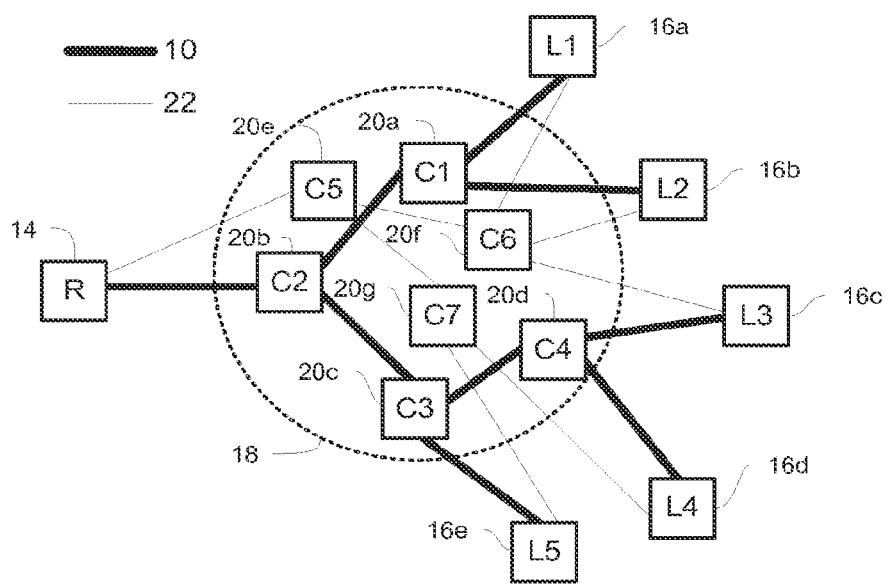
FIG. 2 is a block diagram of an exemplary point-to-multipoint communication system having a working channel and a protection channel, constructed in accordance with the principles of the present invention.

Referring now to FIG. 2, a protection Traffic Engineered Service Instance ("TESI") tree, i.e., protection link 22, is combined with the communication system 12 of FIG. 1. Protection link 22, like working link 10, connects the root node 14 to a plurality of leaf nodes L1 16a, L2 16b, L3 16c, L4 16d and L5 16e through an independent set of core nodes C5 20e, C6 20f and C7 20g. The path of protection link 22 is denoted in FIGS. 2-3, 5 and 7 as a thin, black line connecting the nodes. The protection link 22 is an alternate configuration for routing traffic between the root node 14 and the leaf nodes 16 and is generally used only in the case where there is a fault or failure in any of the connections along the working link 10. The protection link 22 should, ideally, be route diverse and link diverse from the working link 10. In other words, no core nodes 20 or connections should be included in both the working link 10 and the protection link 22. As used herein, the "current" link is either the working link or the protection link. Data is transferred through a current link of the point-to-multipoint tree.

Figure 3:
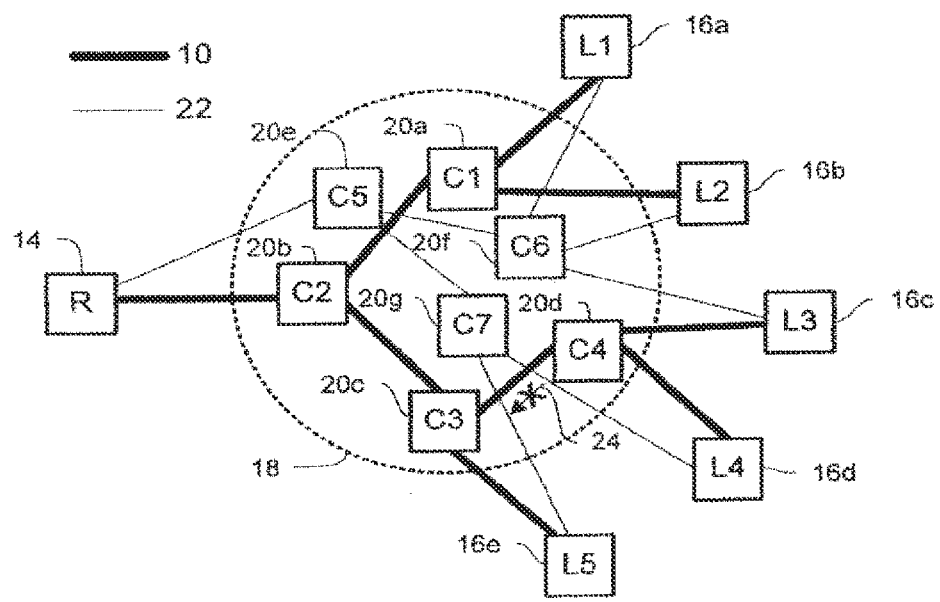
FIG. 3 is a block diagram of an exemplary point-to-multipoint communication system showing a fault in one link in a leaf-to-root direction, constructed in accordance with the principles of the present invention.
Figure 4:
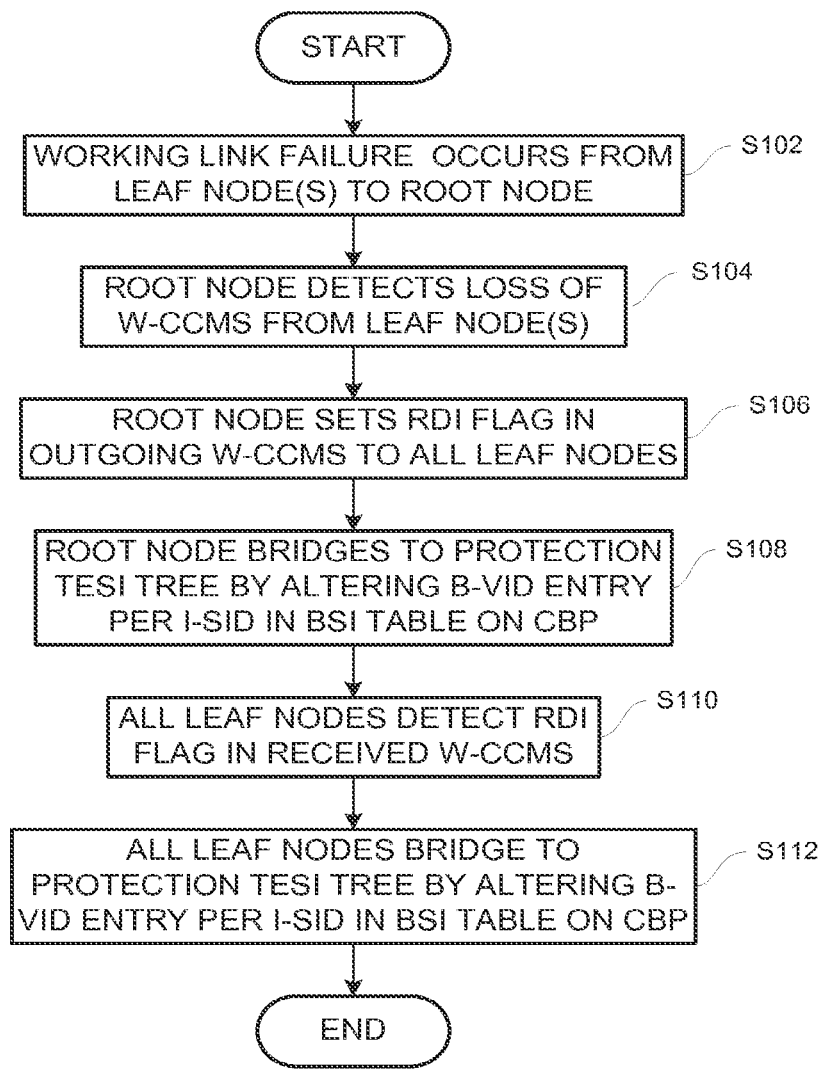
FIG. 4 is a flow chart of an exemplary protection switching process performed when a fault is in one link of a point-to-multipoint communication system in a leaf-to-root direction according to the principles of the present invention.

Referring now to FIG. 3, a scenario is depicted wherein the communication system 12 of FIGS. 1 and 2 contains a fault 24 between core nodes C4 20d and C3 20c, in the direction from the leaf nodes L3 16c and L4 16d toward the root node 14. In FIG. 4, an exemplary operational flowchart is provided that describes steps performed by the communication system 12 when a link or connection fails in the direction of leaf-to-root. The process begins when the working link 10 experiences a failure in the direction of a leaf node 16 towards the root node 14 (step S102). Note that the working path 12 remains intact in the direction from the root node 14 to leaf nodes 16. In this case, the root node 14 recognizes that it has not received a CCM from at least one leaf node 16 via the working link 10 for greater than a predetermined amount of time (step S104). The root node 12 sets a Remote Defect Indicator ("RDI") flag in all CCMs outgoing to leaf nodes 16 via the working link 10 (step S106). The root node 14 bridges to the Protection TESI tree, i.e., protection link 22, simply by altering the B-VID entry per Backbone Service Instance Identifier ("I-SID") in a Backbone Service Instance ("BSI") table located on the Customer Backbone Port ("CBP") (step S108).

All the leaf nodes 16 in the point-to-multipoint communication system 12 receive the CCM containing the RDI set by the root node 14 (step S110). All the leaf nodes 16 bridge over to the protection link 22 by altering their B-VID entry per I-SID in the BSI table (step S112). Thus, the traffic flowing on the entire tree structure switches to the protection link 22 when a fault is discovered on any one connection.

Figure 5:
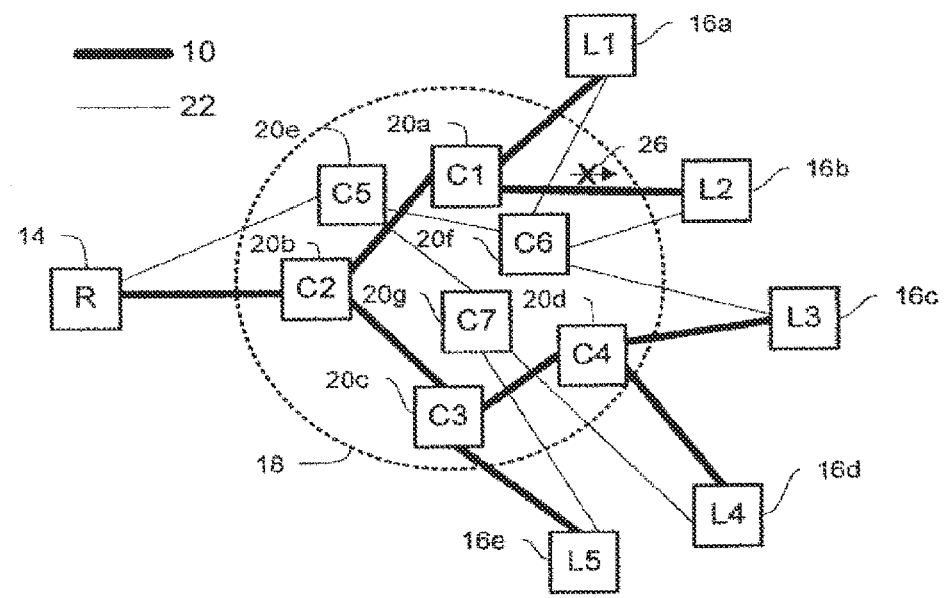
FIG. 5 is a block diagram of an exemplary point-to-multipoint communication system showing a fault in one link in a root-to-leaf direction, constructed in accordance with the principles of the present invention.
Figure 6:
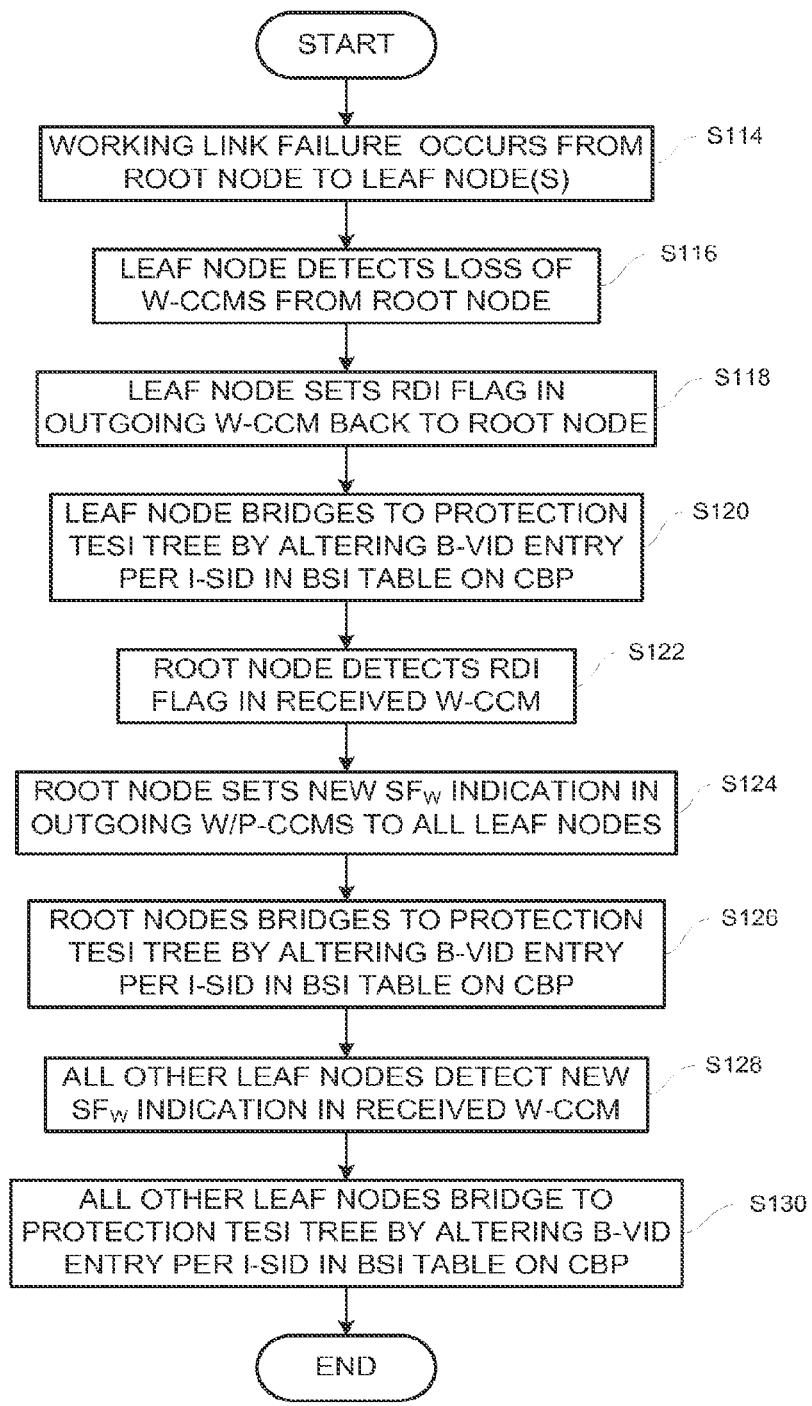
FIG. 6 is a flow chart of an exemplary protection switching process performed when a fault is in one link of a point-to-multipoint communication system in a root-to-leaf direction according to the principles of the present invention.

Referring now to FIG. 5, a scenario is depicted wherein the communication system 12 of FIGS. 1 and 2 contains a fault 26 between core node C1 20a and leaf node L2 16b, in the direction from the root node 14 toward the leaf node L2 16b. In FIG. 6, an exemplary operational flowchart is provided that describes steps performed by the communication system 12 when a link or connection fails in the direction of root-to-leaf. The process begins when the working link 10 experiences a failure in the direction of the root node 14 towards a leaf node 16 (step S114). In this case, the leaf node 16 recognizes that it has not received a CCM from the root node 14 via the working link 10, i.e. working CCM ("W-CCM"), for greater than a predetermined amount of time (step S116). The leaf node 16 sets an RDI flag in a CCM going out to the root node 14 via the working link 10 (step S118). The leaf node 14 bridges to the protection link 22, by altering its B-VID entry per I-SID in the BSI table (step S120).

The root node 14 detects the RDI flag set in the received W-CCM (step S122). The root node 14 sets a new signal fail working ("SF$_W$") indication in outgoing working and protection CCMs ("W/P-CCMs") directed toward all leaf nodes 16 on the working link 10 (step S124), thereby acting as a proxy for the leaf node 16 in notifying all other leaf nodes 16 of the detected fault 26. The new SF$_W$ indication may be an Automatic Protection Switching ("APS") Type-Length-Value ("TLV") indicator, as shown below in reference to FIGS. 9-11. The root node 14 bridges to the protection link 22 by altering its B-VID entry per I-SID in the BSI table (step S126).

All the other leaf nodes 16 in the working link 10, i.e., those leaf nodes 16 that did not detect a CCM loss, receive the CCM from the root node 14 containing the new SF$_W$ indication (step S128) and bridges to the protection link 22 by altering their B-VID entries per I-SID in the BSI table (step S130).

Figure 7:
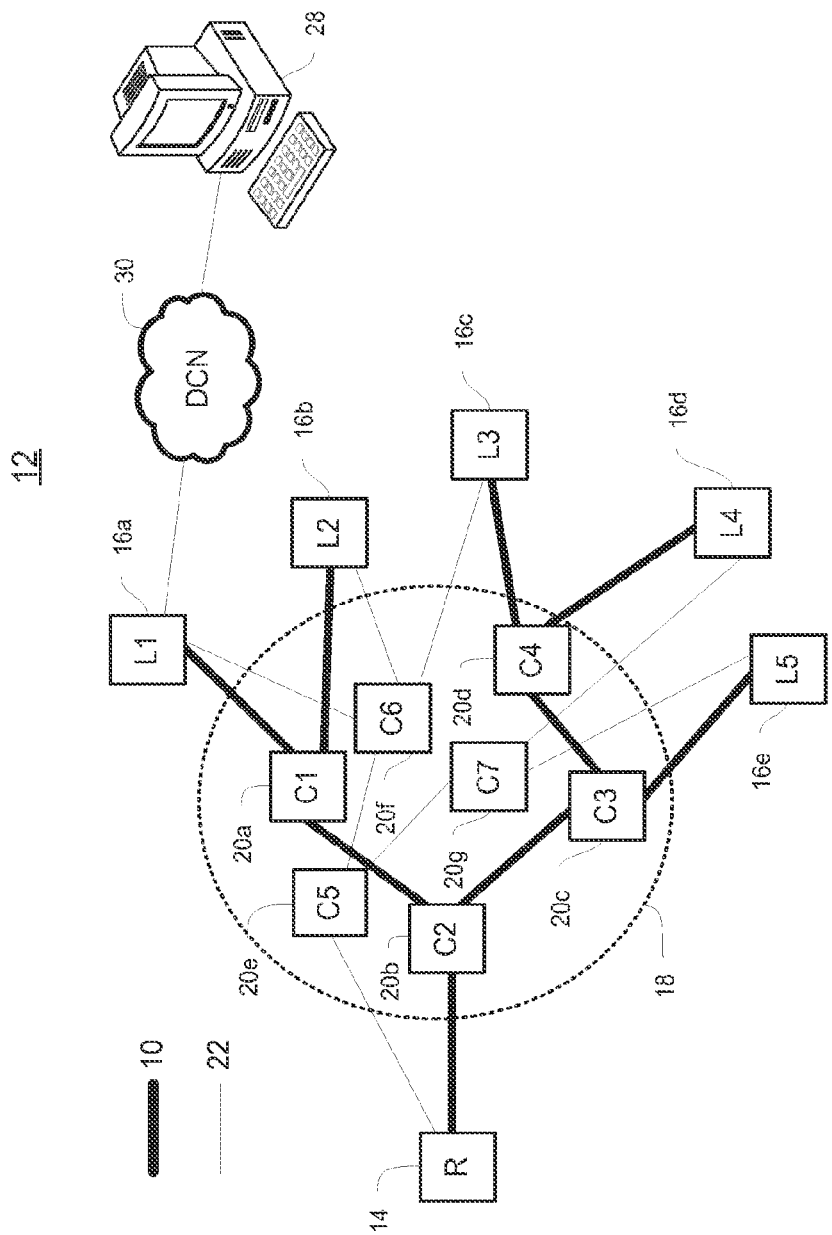
FIG. 7 is a block diagram of an exemplary point-to-multipoint communication system supporting operator requests, constructed in accordance with the principles of the present invention.

Referring now to FIG. 7, a scenario is depicted wherein the communication system 12 of FIGS. 1 and 2 further includes an Element Management System ("EMS") 28 in communication with at least one node through a Data Communication Network ("DCN") 30. The DCN may include a wired or wireless wide area network ("WAN") which may include the Internet, intranet, or other communication network. The principles of the present invention may also apply to other forms of communication networks, such as personal area networks ("PANs"), local area networks ("LANs"), campus area networks ("CANs"), metropolitan area networks ("MANs"), etc. The EMS 28 is generally maintained by an Internet Service Provider ("ISP") or other operator.

Figure 8:
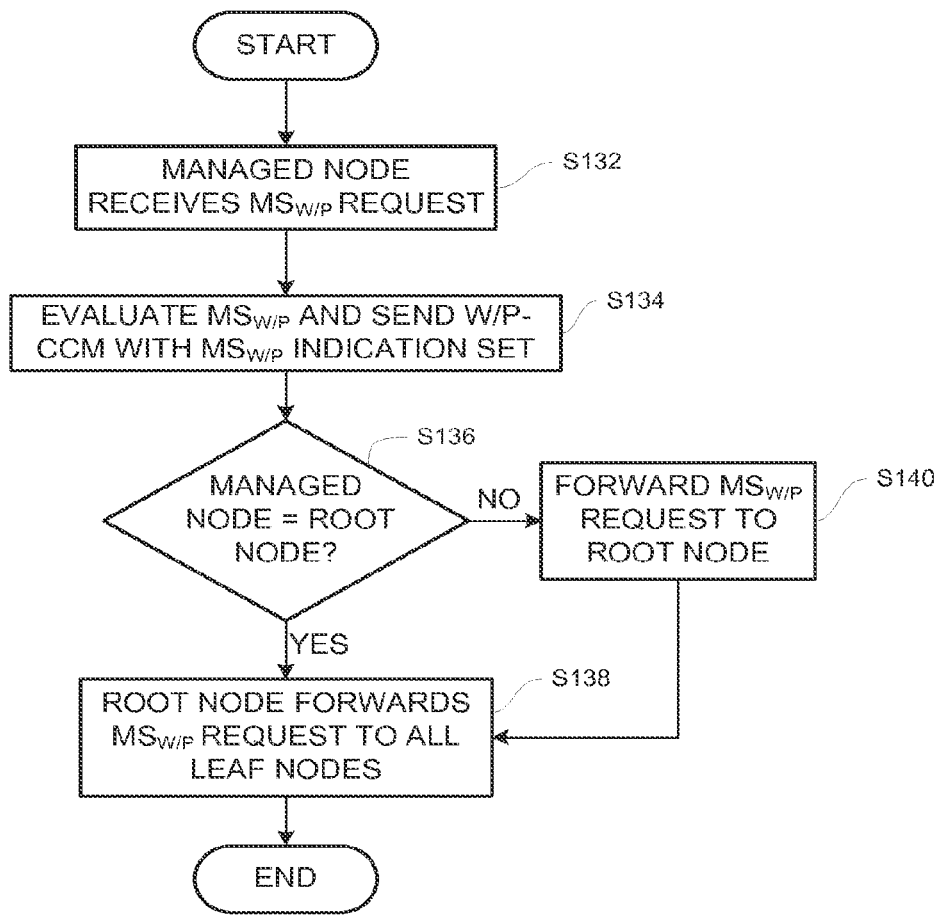
FIG. 8 is a flow chart of an exemplary in-band signaling process performed according to the principles of the present invention.

In FIG. 8, an exemplary operational flowchart is provided that describes steps performed by the communication system 12 for executing management system requests. The process begins when a managed node receives a management system ("MS$_{W/P}$") request from an EMS 28 (step S132). The MS$_{W/P}$ request may include, for example, a Force Switch ("FS"), Lockout of Protection ("LoP"), or Manual Switch ("MS") instruction. FS and LoP instructions are highest priority instructions and either require all traffic to move to the other link, i.e., FS, or prevent any traffic from being moved to the link, i.e., LoP. An MS instruction is a lower priority instruction and may be forwarded if resources allow. The managed node evaluates the MS$_{W/P}$ request and sends out a W/P-CCM (i.e., sends a CCM on both the working and protection links carrying the same value of APS TLV, the APS TLV is shown below in reference to FIGS. 9-11) containing a MS$_{W/P}$ indication set if the communication system 12 is able to implement the request, e.g., the indicated link is available, the request does not have a lower priority than conditions already in place, etc.

If the managed node is a root node 14 (step S136), then the root node 14 forwards the MS$_{W/P}$ request to all leaf nodes 16 (step S138). However, if the managed node is a leaf node 16

(step S136), then the leaf node 16 forwards the MS$_{W/P}$ request to the root node 14 (step S140) and the root node 14, in turn, forwards the MS$_{W/P}$ request to all leaf nodes 16 (step S138).

Figure 9:
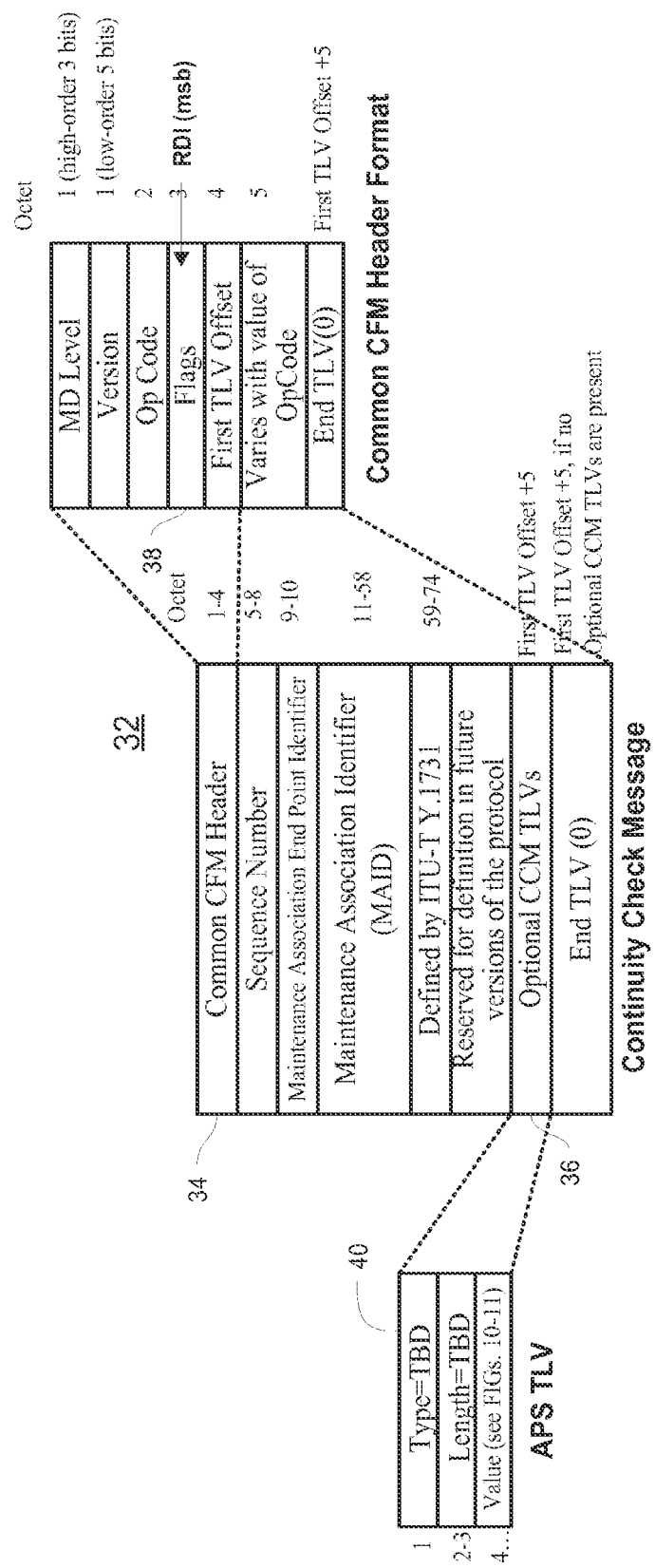
FIG. 9 is a diagram showing an exemplary format structure of an Automatic Protection Switching ("APS") Type-Length-Value ("TLV") within the Continuity Check Message ("CCM"), in accordance with the principles of the present invention.

Referring now to FIG. 9, an exemplary format structure of a Continuity Check Message ("CCM") 32 is provided in accordance with the principles of the present invention. The CCM 32 is defined by IEEE standard 802.1Q-2005 amendment 802.1ag and includes, inter alia, fields for a four octet Common Connectivity Fault Management ("CFM") header 34 and optional CCM TLVs 36. The third octet of the CFM header 34 includes a flag field 38, of which the most significant bit is an RDI flag. In one embodiment of the present invention, the CCM 32 includes a new APS TLV 40 in the optional TLV field 36. Embodiments of the APS TLV 40 value field are presented in FIGS. 10 and 11.

Figure 10:
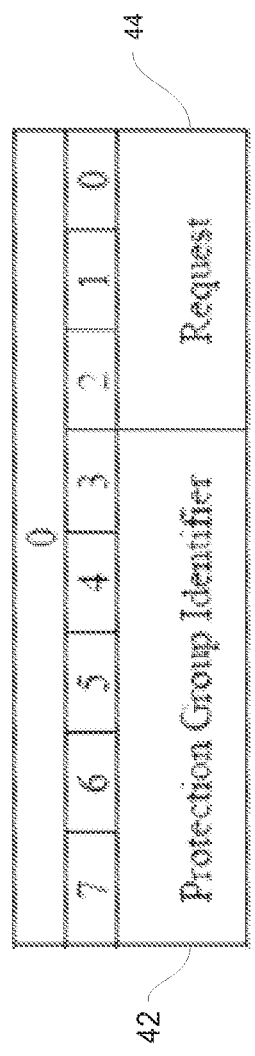
FIG. 10 is a diagram showing an exemplary format structure of the Value field within an APS TLV, in accordance with the principles of the present invention.

Referring now to FIG. 10, one embodiment of an APS TLV 40 includes a one-byte field consisting of a 5-bit protection group identifier ("PGID") 42 and a 3-bit request 44. The leaf nodes 16 of a communication system 12 may be subdivided into different protection groups by services and each subgroup is identified by a PGID 42. A variety of functions may be defined for the request 44 and the priority of the request 44 is determined by the request value from highest to lowest, wherein "111" is assigned the highest priority and "000" is assigned the lowest priority. Exemplary values for request 44 are provided in table 46. For example, requests 44 may include, as discussed above, Lockout of Protection ("LoP"), Force Switch to Protection ("FS"), Signal Fail on Protection ("SF-P"), Signal Fail on Working ("SF-W"), Manual Switch to Protection ("MS-P") and Manual Switch to Working ("MS-W"). Currently, the lowest values, "001" and "000" are reserved for future expansion. As the targeted protection group is indicated in the APS TLV 40 value field, for an operator request, only one APS TLV 40 for the relevant protection group is sent. However, using this construction, for a TESI failure affecting all protection groups, multiple APS TLVs are generated, parsed and processed to notify the protection switching processes associated with all protection groups.

Turning now to FIG. 11, an alternative embodiment of an APS TLV 48 value field is presented in accordance with the principles of the present invention. In this embodiment, the APS TLV 48 value field is presented as a 16 byte field, subdivided into 32 4-bit fields. Each 4-bit field represents a switch request 50 for one protection group identifier, with up to 32 protection groups assigned to the APS TLV 48. The position of the switch request 50 within the APS TLV 48 identifies the protection group and the order of protection groups is predetermined. Requests 50 are determined by the values shown in table 54. As above, each request 50 corresponds to a predetermined value, with requests including LoP, FS, SF-P, SF-W, MS-P and MS-W. To send a request 50 to a particular protection group, the value of the request 50 is inserted into the octet corresponding to the targeted PGID. Thus, for a TESI failure affecting all protection groups, a single APS TLV 48 is generated, parsed and processed. The downside to this embodiment is that for an operator request on a single protection group, an unnecessarily large APS TLV 48 is sent; however, since most packetized communication protocols, including Ethernet, set a minimum packet size (e.g., 64 bytes for Ethernet) and fill in any unused space before transmitting, the larger size of the APS TLV 48 is inconsequential. Additionally, a system may implement a combination of the APS TLV 40 and the APS TLV 48, with the appropriate APS TLV 40, 48 structure selected dependant upon the use scenario.

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for in-band protection switch signaling in a communication system, the communication system arranged as a point-to-multipoint tree, the point-to-multipoint tree including a root node communicatively coupled to a plurality of leaf nodes through both a working link and a protection link, the method comprising:
    transferring data through a current link of the point-to-multipoint tree, the current link being one of the working link and the protection link;
    detecting, by a leaf node, a fault in the current link of the point-to-multipoint tree;
    in response to detecting the fault, setting a remote defect indicator (RD I) flag in a continuity check message (CCM) at the leaf node;
    transmitting the CCM to the root node;
    in response to receiving the CCM, notifying, by the root node, each other leaf node in the point-to-multipoint tree of the fault using the current link, the notifying via continuity check messages to the leaf nodes, each continuity check message including a type-length-value (TLV), the TLV having one of a protection group identifier identifying a subset of the leaf nodes according to a service associated with the subset, a signal fail indicator indicating a failure on the current link, or a request value that represents a management command corresponding to the protection group identifier; and
    switching the root node and each leaf node to the other link of the working link and the protection link.

2. A method for in-band protection switch signaling in a communication system, the communication system arranged as a point-to-multipoint tree, the point-to-multipoint tree including a root node communicatively coupled to a plurality of leaf nodes through both a working link and a protection link, the communication system including an element management system managing at least one leaf node of the plurality of leaf nodes, the method comprising:

receiving, by the at least one leaf node, a management system request from the element management system, the management request including a notification of a fault in a current link, the current link being one of the working link or the protection link;

evaluating the management system request to determine whether the communication system is allowed to implement the management system request;

sending, by the root node, continuity check messages to each of the plurality of leaf nodes using the current link, each continuity check message including an automatic protection switching type-length-value (TLV) having a protection group identifier identifying a subset of the plurality of leaf nodes according to a service associated with the subset; and executing the management system request.

3. The method of claim 2, wherein the sending the continuity check messages is in response to determining that the communication system is allowed to implement the management system request;

wherein the automatic protection switching TLV includes at least one request value representing one command of a set of management commands, each request value corresponding to one of the protection group identifiers; and wherein the request value has a 4-bit length and the protection group identifier is determined by a position of the 4-bit request value within the automatic protection switching TLV.

4. The method of claim 3, further comprising:
transferring data through a current link of the point-to-multipoint tree, the current link being one of the working link and the protection link;
detecting a fault in the current link of the point-to-multipoint tree;
the root node transmitting a multicast automatic protection switching request to each leaf node in the point-to-multipoint tree on both the working link and the protection link; and
switching the root node and each leaf node to the other link of the working link and the protection link after transmitting the multicast automatic protection switching request.

5. The method of claim 4, wherein switching the root node and each leaf node to the other link of the working link and the protection link comprises altering a backbone virtual local area network identifier ("B-VID") value in a backbone service instance table.

6. The method of claim 4, further comprising:
setting a remote defect indicator flag in a plurality of continuity check messages; and
transmitting the plurality of continuity check messages to the leaf nodes using the current link, and wherein the root node detects the fault in the current link.

7. The method of claim 6, wherein the root node detects the fault in the current link by determining that the root node has not received a continuity check message from at least one leaf node within a predetermined amount of time.

8. The method of claim 4, further comprising:
setting a remote defect indicator flag in a continuity check message, wherein a leaf node detects the fault in the current link;
transmitting the continuity check message to the root node from the detecting leaf node; and
using the root node as a proxy for the detecting leaf node to notify all other leaf nodes in the tree.

9. The method of claim 8, the root node acting as an in-band signaling proxy agent by responding to a received leaf node protection switch request by transmitting a multicast automatic protection switching request to each leaf node in the point-to-multipoint tree on both the working link and the protection link.

10. The method of claim 9, wherein the automatic protection switching request includes:
a protection group identifier identifying a subset of the leaf nodes according to service; and
a signal fail on current link indicator.

11. The method of claim 8, wherein the leaf node detects the fault in the current link by determining that the leaf node has not received a continuity check message from the root node within a predetermined amount of time.

12. The method of claim 2, wherein the set of management commands includes at least one of lockout of protection, force switch to protection, signal fail on protection, signal fail on working, manual switch to protection and manual switch to working.

13. The method of claim 1, further comprising:
an element management system managing at least one leaf node of the plurality of leaf nodes;
receiving, by the at least one leaf node, a management system request from the element management system, the management request including a notification of the fault in the current link;
evaluating the management system request to determine whether the communication system is allowed to implement the management system request; and
executing the management system request.

14. The method of claim 13, wherein transmitting the continuity check messages is in response to determining that the communication system is allowed to implement the management system request;

wherein the automatic protection switching TLV includes at least one request value representing one command of a set of management commands, each request value corresponding to one of the protection group identifiers; and wherein the request value has a 4-bit length and the protection group identifier is determined by a position of the 4-bit request value within the automatic protection switching TLV.

15. The method of claim 14, further comprising:
the root node transmitting a multicast automatic protection switching request to each leaf node in the point-to-multipoint tree on both the working link and the protection link; and
switching the root node and each leaf node to the other link of the working link and the protection link after transmitting the multicast automatic protection switching request.

16. The method of claim 15, wherein switching the root node and each leaf node to the other link of the working link and the protection link comprises altering a backbone virtual local area network identifier ("B-VID") value in a backbone service instance table.

17. The method of claim 15, wherein the root node detects the fault in the current link by determining that the root node has not received a continuity check message from at least one leaf node within a predetermined amount of time.

18. The method of claim 15, further comprising:
using the root node as a proxy for the detecting leaf node to notify all other leaf nodes in the tree.

19. The method of claim 18, the root node acting as an in-band signaling proxy agent by responding to a received leaf node protection switch request by transmitting a multicast automatic protection switching request to each leaf node in the point-to-multipoint tree on both the working link and the protection link.

20. The method of claim 19, wherein the automatic protection switching request includes:
   a protection group identifier identifying a subset of the leaf nodes according to service; and a signal fail on current link indicator.

* * * * *